Aug. 12, 1969 G. J. EASTON 3,460,485
ELECTROMAGNETICALLY-PROPELLED VEHICLES
Filed June 12, 1967 2 Sheets-Sheet 1
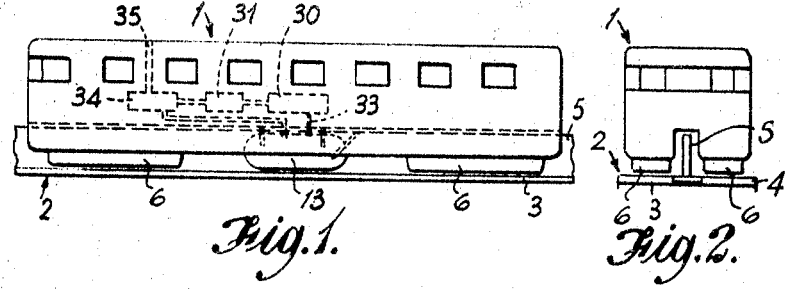
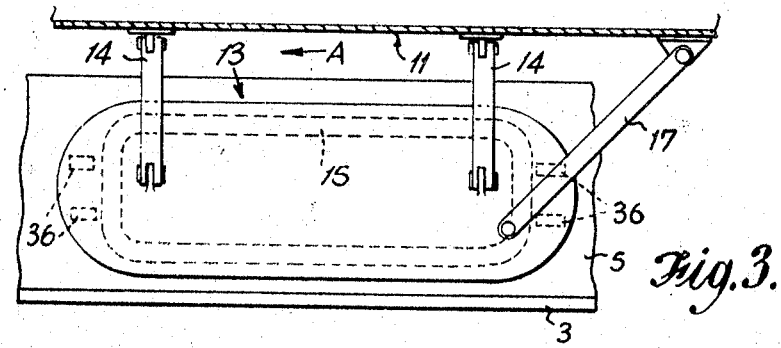
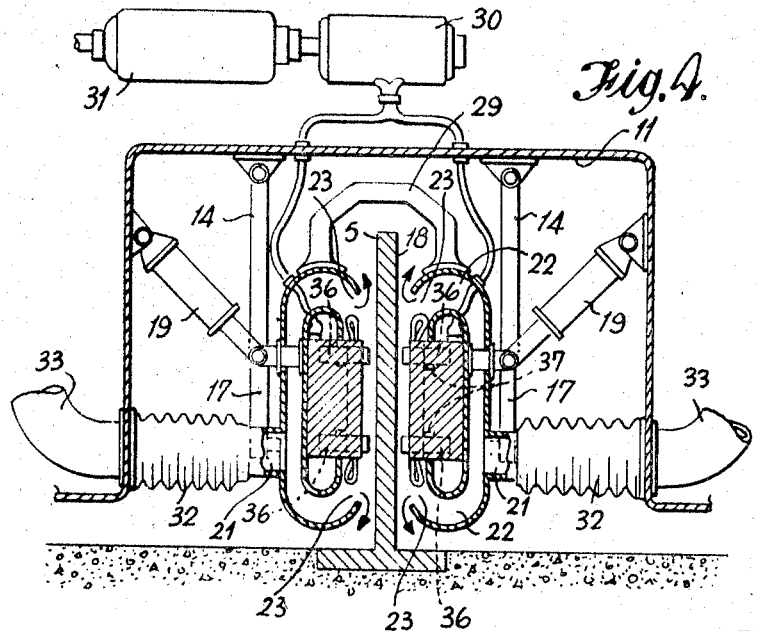
INVENTOR
G. J. EASTON
BY
Cameron, Kerkam & Sutton
ATTORNEYS Aug. 12, 1969  G. J. EASTON  3,460,485
ELECTROMAGNETICALLY-PROPELLED VEHICLES
Filed June 12, 1967  2 Sheets-Sheet 2
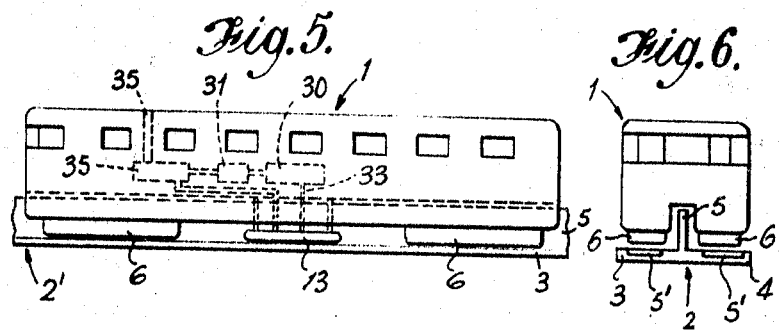
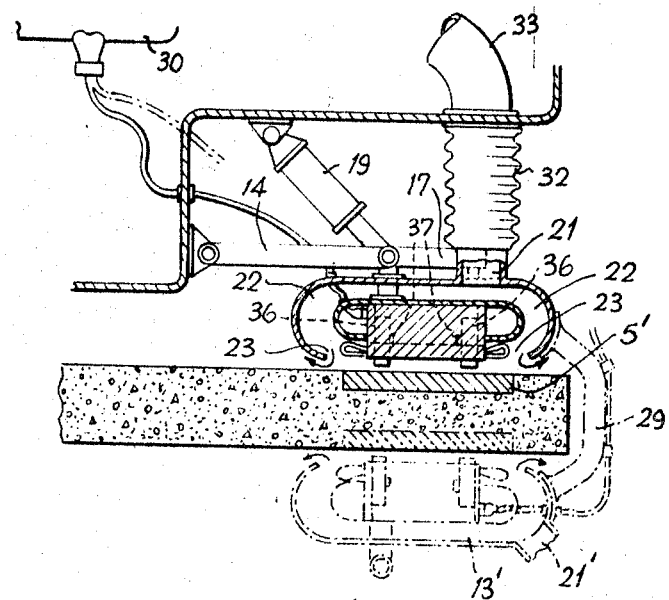
INVENTOR
G. J. EASTON
BY
Cameron, Kerkam & Sutton
ATTORNEYS

United States Patent Office 3,460,485
Patented Aug. 12, 1969

3,460,485
ELECTROMAGNETICALLY-PROPELLED VEHICLES
Geoffrey John Easton, Highcliffe, Christchurch, England, assignor to Hovercraft Development Limited, London, England, a British company
Filed June 12, 1967, Ser. No. 645,132
Claims priority, application Great Britain, June 15, 1966, 26,744/66
Int. Cl. B61b *13/08;* B60v *3/04;* B60l *13/00*
U.S. Cl. 104—148
9 Claims

ABSTRACT OF THE DISCLOSURE

An electromagnetically-propelled vehicle in which motor poles carried by the vehicle co-operate with an electrically conductive portion of the vehicle track from which they are separated by the action of a gas cushion arrangement.

---

This invention relates to electromagnetically-propelled vehicles which travel along prepared tracks and which include a stator structure operable to produce a magnetic field which co-operates with an electrically-conductive part of the track to propel the vehicle. Such propulsion arrangement is known as a linear electric motor, the stator structure being so called because of its functional resemblance to the stator of a rotary electric motor. A vehicle propelled by a linear motor has been described in Patent No. 3,356,041.

It is desirable for the stator structure carried by the vehicle to be a substantially constant distance from the track, and it is an object of this invention to provide means to achieve this.

The present invention provides an electromagnetically-propelled vehicle for travelling along a prepared track having an electrically conducting part, a main body portion to said vehicle, a stator assembly for co-operating with said electrically conducting part of said track, means connecting said stator assembly with said main body portion of said vehicle and allowing movement of the assembly towards said track part, biassing means for urging said stator assembly towards said track part, electrical means for energising the stator to produce a magnetic field which co-operates with said track part thereby to propel the vehicle, and gas cushion producing means, for producing a cushion of gas separating the assembly from said track part.

The cushion of gas may be formed between the assembly and a substantially vertical surface of the track, and the assembly may be connected to the vehicle by one or more link members pivotally connected to the assembly and to the vehicle. Alternatively or additionally, the or a cushion of gas may be formed between the assembly and a substantially horizontal part of the track.

The vehicle may be supported by gas under pressure emitted from the vehicle to form a cushion of gas between the track and the vehicle, for example as described in previously mentioned Patent No. 3,356,041.

One embodiment of the present invention will now be described, by way of example, with reference to the accompanying drawings, of which:

FIGURES 1 and 2 are side and end views respectively of a track-located gas-cushion vehicle;

FIGURE 3 is a diagrammatic side view of part of the vehicle and track of FIG. 1;

FIGURE 4 is a diagrammatic end view of the vehicle and track;

FIGURES 5 and 6 are side and end views respectively of another track-located gas-cushion vehicle according to the invention; and FIGURE 7 is a diagrammatic end view of part of the vehicle and track of FIGURES 5 and 6.

Referring first to FIGURES 1–4 of the accompanying drawings, a track-located gas-cushion vehicle 1 travels on a rail 2 with a cross-section of inverted T-shape, the rail 2 having two horizontal portions 3, 4 and a vertical electrically conduction portion 5. The vehicle 1 has four load-supporting units 6, two of these units 6 being adjacent one end of the vehicle 1 on opposite sides of the vertical rail portion 5 and the other two rail units 6 being adjacent the other end of the vehicle 1 on opposite sides of the vertical rail portion 5. The vehicle 1 is supported by cushions of air formed between the units 6 and the horizontal rail portions 3, 4 as described, for example, in application Ser. No. 639,488, filed May 18, 1967. The vehicle is propelled along the rail or track 2 by linear motor means as described, for example, in Patent No. 3,356,041.

Two similar stator assemblies 13 of the linear motor means are mounted beneath the main body portion 11 of the vehicle 1, one on each side of the vertical rail portion 5 which provides the "rotor." The assemblies are connected together by a mechanical link 29 extending over the upper edge of the portion 5.

Each of the two assemblies is connected to the main body portion 11 by four links 14 which are pivotally connected to the main body and to the assembly 13 such that the assembly 13 can move angularly relative to the main body 11 in a direction perpendicular to the direction of travel of the vehicle (indicated by the arrow A in FIGURE 3).

The assembly 13 includes a stator structure having a series of windings 15 which can be fed with polyphase current from a generator 30 driven by a motor 31 in the main body 11 of the vehicle 1 to produce a magnetic field which co-operates with the vertical electrically-conducting portion 5 of the track rail 2 to propel the vehicle. The propelling force is transmitted to the main body 11 from the assembly 13 by a tie member 17 pivotally connected to the assembly 13 and to the main body 11. The assembly 13 is resiliently urged towards the adjacent vertical surface 18 of the vertical rail portion 5 by biassing means constituted by a telescopic damper 19 pivotally connected to the assembly 13 and to the main body 11.

The assembly 13 has an air inlet 11 to which air under pressure is supplied through tubing 32, 33 from a compressor 34. The compressor 34 is driven by the motor 31 on the main body 11 of the vehicle and vents air through an air intake 35. Air from the compressor passes through a duct 22 in the assembly 13 and is emitted from the assembly 13 through a peripheral slot 23 in such a manner that a cushion of air is formed and then contained between the assembly 13 and the vertical surface 18 of the rail portion 5. The thickness of the cushion of air depends upon the air pressure and upon the force exerted by the damper 19. The thickness of the air cushion, and thus the distance between the assembly 13 and the rail portion 5, remains substantially constant at a predetermined value. The force exerted by the air cushion tending to separate the assembly 13 and the rail portion 5 is a function of the distance between the assembly 13 and the rail portion 5, and this force and the force exerted by the damper 19 co-operate to maintain the thickness of the air cushion between the assembly and the rail portion at a substantially constant value, e.g. half an inch.

In the event that the air cushion fail or be identically absent, e.g. for low vehicle speeds, the assembly 13 is held away from direct contact with the track by abutment means constituted by wheels 36 which are mounted on axles 37 to allow a relative movement between the assembly and the track in the direction of vehicle motion. Obviously, the wheels 36 could be replaced by slides or any other suitable abutment means. With an assembly-track separation of half an inch, the wheel track separation might typically be a quarter of an inch for example.

In a variation of the invention, shown in FIGURES 5-7, the vehicle assemblies 13 are modified for use with a different type of track 2′ in which the vertical electrically conducting portion 5 of the track 2 is replaced by two horizontal electrically conducting strips 5′. Thus in the variation of FIGURES 5-7 each of the two assemblies 13 is positioned beneath the main body 11 of the vehicle to allow co-operation of the windings 15 with the strips 5′ and thereby provide a means for propelling the vehicle.

In a modification indicated in chain lines, the rail or track is of modified form and allows the use of a further pair of stator assemblies (only one of which 13′ is shown) co-operating with lower electrically conducting strip surfaces of the track. As indicated, adjacent assemblies of the pairs of assemblies may be interconnected by a mechanical link 29 as in the arrangement of FIGURES 1-4.

As will be clearly apparent from FIGURES 5-7, each of the assemblies 13 shown there is arranged to form between that assembly and the associated portion of the track a cushion of gas which separates the assembly from the track portion in exactly the same way as the cushion of gas provided by the duct 22 separates the assembly 13 from the vertical rail portion 5 in the arrangement of FIGURES 1-4, except that elements previously moving or acting in a vertical direction will now move or act in a horizontal direction and vice versa. Elements performing the same functions with respect to the assembly and the track in the embodiments of FIGURES 1-4 and FIGURES 5-7 have been identified by the same reference numerals throughout the specification and drawings.

It will be appreciated that although in the embodiments of the invention above described, the gas cushion arrangements supporting the vehicle and separating the stator assembly from track portion have both employed air curtains to confine the cushions laterally, the invention is equally applicable where one or both of these arrangements uses a flexible skirt arrangement to bound, at least in part, the cushions formed in operation of the vehicle.

I claim:

1. An electromagnetically-propelled vehicle for travelling along a prepared track having an electrically conducting part, a main body portion to said vehicle, a linear induction motor stator assembly for co-operating with said electrically conducting part of said track, means connecting said stator assembly with said main body portion of said vehicle, said connecting means being so constructed that the assembly is movable relative to said main body portion in a direction perpendicular to said conducting part, electrical means for energising the stator to produce a magnetic field which co-operates with said conducting part thereby to propel the vehicle, gas cushion producing means for producing a cushion of gas separating the assembly from said conducting part, and bounding means extending around the periphery of the cushion for containing the cushion.

2. A vehicle as claimed in claim 1 including biassing means which urges the stator assembly towards a surface of said electrically conducting part.

3. A vehicle as claimed in claim 2 wherein said biassing means urges the stator assembly in a substantially horizontal direction for co-operation with a vertical surface of said electrically conducting part.

4. A vehicle as claimed in claim 1 wherein the means connecting said stator assembly with the main body of the vehicle comprises at least one link member pivotally connected to the vehicle and to the assembly.

5. A vehicle as claimed in claim 1 including a tie member pivotally connected between the stator assembly and the vehicle and extending in a plane parallel to the conducting part of the track for transmitting, in operation, a propelling force from the assembly to the vehicle.

6. A vehicle as claimed in claim 1 including abutment means mounted on the stator assembly for spacing the assembly from the conducting part in the absence of a gas cushion.

7. A vehicle as claimed in claim 1 in which the bounding means comprises a slot around the periphery of the cushion and including duct means arranged in the stator assembly to direct the flow of cushion gas to said slot over the stator windings in the assembly, thereby to provide cooling for said windings.

8. A vehicle as claimed in claim 1 including two assemblies arranged beneath the vehicle for co-operation with electrically conductive portions of said track.

9. A vehicle as claimed in any one of claims 1, 2, 3, 4, 5, 6, 7 and 8 including two assemblies with opposed poles for co-operating with opposed portions of the conducting part, and a rigid mechanical link extending over the outer edge of said conducting part and connecting together said two assemblies.

References Cited

UNITED STATES PATENTS 2,548,614  4/1951  Peters _____ 105—59
3,233,559  2/1966  Smith _____ 105—1

ARTHUR L. LA POINT, Primary Examiner

DANIEL F. WORTH III, Assistant Examiner

U.S. Cl. X.R.
104—23